United States Patent Office 3,472,684
Patented Oct. 14, 1969

3,472,684

METHOD AND APPARATUS FOR PRODUCING EPITAXIAL CRYSTALLINE LAYERS, PARTICULARLY SEMICONDUCTOR LAYERS

Albert Walther, Neubiberg, Germany, assignor to Siemens Aktiengesellschaft, Erlangen, Germany, a corporation of Germany Filed Jan. 26, 1966, Ser. No. 523,233
Claims priority, application Germany, Jan. 29, 1965, S 95,244
Int. Cl. H01b 1/04
U.S. Cl. 117—201 22 Claims

ABSTRACT OF THE DISCLOSURE

Described are method and apparatus of growing epitaxial crystalline layers on substrates in a reaction vessel by precipitation of material from reaction gas supplied through the opening of a supply member toward a given precipitation area where the substrates are located in spaced relation to said opening. The method comprises moving the supply member for the duration of the precipitation process over said area in a curve closed upon itself so as to have the image defined by the orthogonal projection of said opening onto said total precipitation area reach equally often every point of the same radial distance from the center of said area. The apparatus comprises a reaction vessel, substrate heater means disposed in said vessel and defining a precipitation area for accommodating the substrates, reaction gas supply means extending from the outside into said vessel and having gas nozzle means with a gas supply opening opposite and spaced from said area, said nozzle means being movable relative to said area so as to permit moving said opening along a closed curve to have the image defined by the orthogonal projection of said opening onto said precipitation area reach equally often any point equally spaced from the center of said area.

My invention relates to epitaxial methods and apparatus of the type employed for producing semiconductor circuit components.

According to the epitaxial method, semiconductor crystalline, particularly monocrystalline substrates, such as wafers or thin plates, are heated to a high temperature below the melting point of the semiconductor material, and a reaction gas is simultaneously passed over the substrates to become dissociated at the substrate temperature so that semiconductor material is precipitated onto the substrates. If the substrates are monocrystalline, the thin layer thus epitaxially grown upon them is likewise monocrystalline. The heating of the substrate wafers is preferably effected electrically, for example by placing them on top of a heater consisting of heat-resistant conducting material which is traversed by electric current, thus heating the substrates by direct contact or through an insulating intermediate layer. Various other ways of heating the substrates have also been employed. The reaction gas preferably comprises a halogen or hydrogen-halogen compound of the semiconductor material, such as silicon, to be precipitated. This active constituent of the reaction gas is preferably diluted with hydrogen and in some cases also with an inert gas. The reaction gas may further contain doping additions of a defined concentration.

The production of semiconductor circuit components by epitaxial methods poses exacting requirements as to uniformity of the precipitated layers with respect to thickness and doping properties, particularly the avoidance of a lateral or tangential component of the doping-concentration gradient. This applies not only to the individual substrates but also to all of the substrates that may be epitaxially processed simultaneously in the same reaction vessel.

In the copending application of E. Sussmann for Epitactic Method, Ser. No. 515,304, filed Dec. 24, 1965, there is disclosed a method for the epitaxial precipitation of a crystalline layer of semiconductor material upon a heated crystalline substrate of semiconductor material by passing a reaction gas through the reaction space, in which the desired uniformity of the products is secured by passing the reaction gas into the reaction space at a speed not higher than corresponds to the Reynolds number 50. This method is preferably performed by supplying the gas from above through a tube extending downwardly into the reaction space. After the gas leaves the tube at a Reynolds number of not more than 50, it reaches the horizontal substrate surface after passing through a vertical distance of at most 1.5 times the diameter of the reaction space, measured at the height of the semiconductor substrates above the bottom of the reaction space. The spent reaction gas is withdrawn upwardly out of the reaction vessel. This method leads to improved results.

According to the present invention, however, I have discovered that the desired uniformity of the epitaxially produced layers on substrates can be achieved by a different and in some respects more favorable process. It is therefore one of the objects of my invention to provide a method of securing an improved uniformity of epitaxially grown layers, particularly crystalline layers of semiconductor material on crystalline substrates, which does not necessarily demand given speed conditions of the reaction gas flow. It is also an object to provide a method for uniform epitaxial precipitation, which lends itself more readily to being applied to larger precipitation areas and consequently to the simultaneous epitaxial processing of a larger number of substrates as compared with the method previously proposed. Another object of the invention is to provide an epitaxial method which, in conjunction with the one described in the above-mentioned copending application leads to optimal results beyond those heretofore attained.

According to the invention, the reaction gas from which the material is dissociated to precipitate in form of an epitaxial crystalline layer on one or more substrates, is supplied through the opening of a supply member, such as an inlet tube, toward the precipitation area where the substrates are located substantially in a plane transverse to the flow direction of the approaching gas; and, for the duration of the epitaxial precipitation, this supply member is kept in motion in front of the precipitation area on a curved travel path closed upon itself in such a manner that the "image," defined by the orthogonal projection of the gas inlet opening onto the total precipitation area, will reach equally often every point that has the same radial distance from the center of the precipitation area.

According to another feature of the invention, the speed of the movement of the "image" is varied in inverse relation to the distance of the image from the center of the precipitation area, so that the dwell time of the image decreases monotonously, or incrementally monotonously, from any outer point of the travel curve to a point located closer to the center. In the limit case, that is when the above-mentioned closed travel curve is a circle, the speed and consequently the dwell time of the "image" is preferably kept constant along the circular travel.

It is further preferable to perform the method in such a manner that the above-mentioned conditions are satisfied already in each interval of time that suffices for precipitating a discernible layer thickness, particularly a thickness of 2 microns or less, although such an interval may constitute only a fraction of the total time required for the complete growing process.

The method of the invention may be performed with several substrates, particularly semiconductor wafers, placed into the processing space so that their precipitation-receiving surfaces are located in a single plane. For good utilization of the reaction gas, the perimeter of the entire useful precipitation area should be as small as feasible in comparison with the size of the area. For that reason, a dense and circularly symmetrical arrangement of the semiconductor discs, wafers or other substrates should be chosen. It is further recommended that the entering direction of the fresh reaction gas into the reaction space be perpendicular or approximately perpendicular to the above-mentioned utilized precipitation area in which the substrates are located.

The method and the necessary equipment are particularly simple if the image of the inlet opening for the fresh reaction gas is moved along the periphery of the total utilized precipitation area, preferably having a circular distribution about its center. Consequently, the gas inlet tube and its opening are preferably guided on a circular path at uniform speed. This mode of operation will be more fully described hereinafter. However, other ways of performing the method of the invention are better suitable in cases where the total utilized precipitation area is not a circle. Thus, for example, the image of the inlet location for the fresh reaction gas may be guided on a substantially epicyclical path along the periphery of the total precipitation area.

The path of the image may also be given an elliptical shape having its center coincident with the center of the utilized precipitation area and having its main axes continuously varied such as by rotation about the center. If the distance of the image point from the center of the total precipitation areas varies along the travel, as is the case, for example with the elliptical path just mentioned, it is advisable to have the travel speed of the image increase as the image comes closer to the center of the precipitation area and decrease as the image on its travel moves away from the center. The movement in each case should be monotonous in a continuous or incremental manner.

The circular motion is most simply applicable for performing the method of the invention and can thus most favourably be embodied in suitable processing equipment. The other above-mentioned modes of travel on a closed curve, however result in a still more uniform precipitation over the entire extent of the utilized precipitation area, especially if this area is rather large.

Apparatus particularly well suitable for the method according to the present invention are illustrated by way of example on the accompanying drawings in which.

Figure 1:
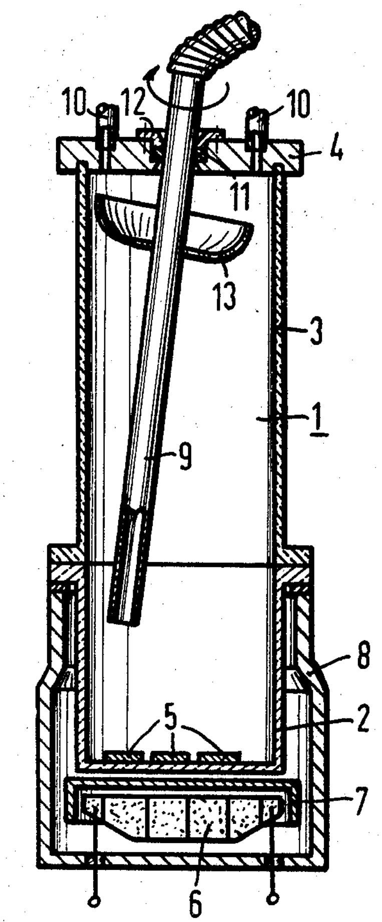
FIG. 1 shows in vertical section a processing apparatus in which the orthogonal image of the moving gas inlet opening upon the utilized precipitation area, is preferably given a circular movement.

In the apparatus illustrated in FIG. 1, a cylindrical reaction space 1 is formed by a pot-shaped bottom portion 2 and a cylindrical top portion 3, both preferably consisting of quartz. The top of the reaction space is closed by a cover 4 of metal such as stainless steel. The substrates 5 to be provided with epitaxial layers are placed flat upon the bottom of the vessel portion 2 and are heated from below by means of an electrical heater element 6 through a heat-equalizing plate 7. As far as described, the components of the apparatus correspond to those illustrated and described in the above-mentioned copending application.

However, for the purpose of the present invention, the gas supply tube 9 is movably mounted in the cover 4 and is sealed gas-tightly relative thereto. For this purpose a gasket ring 11 is forced by a pressure ring 12 against an annular shoulder of the cover 4 and around the tube 9. The gasket 11 consists of chemically and thermally resistant elastomer material. In this particular example of equipment, the gas suply tube 9, consisting of quartz or temperature-resistant metal such as stainless steel, need not rotate about its axis. Mounted outside of the reaction vessel are the mechanisms for causing the upper end of the tube 9 to perform a rotary motion as indicated by an arrow. This motion is in accordance with the desired travel curve, for example a circle. The outer end of the tube 9 is connected by a corrugated and flexible hose connection with a supply for fresh reaction gas.

Instead of a single gas supply tube 9, a gas inlet system composed of several such tubes may be employed, this system being formed inside the reaction vessel by branches extending from the single tube portion that passes through the center of the cover 4 to the outside. In this case it is preferable to provide a high flow resistance in each of the mutually parallel gas supply branches within the vessel, in order to equalize the individual flow velocities to one and the same value at the respective tube openings where the gas enters into the surrounding space of the processing vessel. Such flow resistances may simply consist of respective constrictions in the individual branch tubes.

In the interior of the reaction space the gas supply tube 9 is surrounded by a protective cuff which is rigidly joined with the tube and has the shape of an upwardly open shell. The cuff serves as a radiation shield against excessive heating of the cover 4 which is preferably kept at a temperature not appreciably higher than 100° C. The cuff 13 further catches any particles which may be formed at the cover 4 and might act as spurious crystal seeds.

As a rule, the reaction space 1 has a circularly cylindrical shape. This space, as well as the gas supply tube 9, is so dimensioned that the Reynolds number of the gas flow in the tube 9 or in the reaction space 1 will not exceed the value 50. Furthermore, the distance between the opening of the tube 9 inside the vessel and the horizontal top plane of the flat substrate discs or wafers 5 is made smaller than 1.5 times the hydraulic diameter of the reaction space 1 measured at the height of the substrates 5. For preserving the purity of the reaction gases it is further advisable to have the gas supply tube 9 always protrude into the bottom portion 2 of the reaction vessel in cases where the bottom portion 2 and the top portion 3 of the vessel can be removed from each other.

As mentioned, the means for moving the tube 9 are coupled with the tube portion located outside of the reaction vessel. The movement of the tube along a circle can be effected for example by means of an eccentrical guide or cam rotatable about a vertical axis. The travel motion is so adjusted that the gas issuing opening 9 of the tube moves above the periphery of the total utilized precipitation area. It has been found recommendable to operate in this case with at least a speed of one-half rotation per minute.

An elliptical motion is obtainable in a simple manner, for example by moving the tube 9 along a correspondingly shaped cam or similar guide. An epicyclical movement can be produced in the known manner by superposition of two circular movements as is well known in kinematics. As mentioned, whenever the motion departs from a circle about the center of the utilized precipitation area, it is preferable to vary the travel speed in dependence upon the distance between the image of the tube opening and the center of the utilized precipitation area. This dependence is obtained, for example by varying the speed of the drive motor which produces the travel motion, in dependence upon the just-mentioned distance.

With any kind of motion along a closed curve, including epicyclical, epicycloidal and elliptical motion, it is desirable to have a dwell time of the image equal to zero in the immediate vicinity of the area center. That is, the path of the image on the total precipitation area should always be a closed curve about the center of the area.

Figure 2:
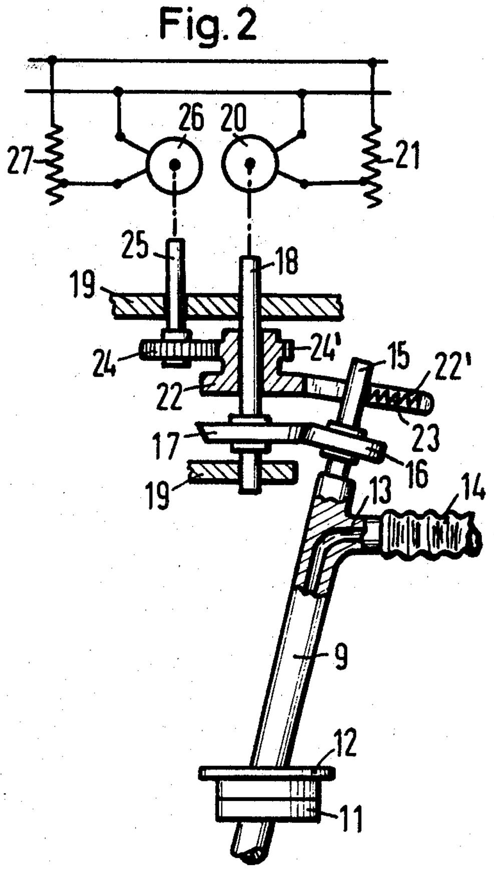
FIG. 2 illustrates a modification of the apparatus suitable for guiding the image on an elliptical path and simultaneously rotating the main axes of this path.
Figure 3:
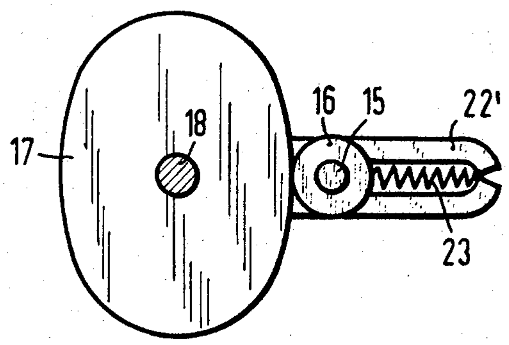
FIG. 3 is a top view onto a detail of FIG. 2.

An embodiment of processing equipment suitable for guiding the image on an elliptical path as described in the foregoing, is schematically shown in FIGS. 2 and 3. This apparatus corresponds to the one illustrated in FIG. 1 with the exception of the upper, external portion of the gas inlet tube 9 and the added mechanism for moving the tube.

The gas inlet tube 9 has a lateral nipple 13 to which a flexible gas supply hose 14 is attached. The tube 9 further carries an axial extension rod 15 on which a cam follower in form of a roller 16 is rotatably mounted. The roller 16 engages the cam periphery of an elliptical cam disc 17 secured to a shaft 18 which is journalled in the stationary mounting structure 19 of the apparatus and can be driven from a motor 20 at a speed adjustable by means of a control rheostat 21.

Rotatably seated on shaft 18 is a loop member 22 whose loop portion 22′ straddles the rod 15 and is equipped with a spring 23, forcing the rod 15 toward the shaft 18 to maintain the roller 16 in engagement with the elliptical cam disc 17. A spur gear 24′ joined with the loop member 22 meshes with a gear 24 whose shaft 25 is driven from a motor 26 at a speed controllable by means of a rheostat 27.

During operation of the apparatus, the motor 26 drives the loop member 22 which, during its rotation about the shaft 18, causes the roller 16 and the tube 9 to travel along an elliptical path. Simultaneously, the motor 20 may be operated at relatively slow speed to rotate the elliptical cam system 17 so that the axes of the elliptical path continuously vary their annular position relative to the precipitation area on which the substrates 5 (FIG. 1) are located.

The resistance of the speed control rheostat 27 for motor 26 may be varied during the operation of the apparatus so that the speed of the tube opening or its image increases as the travel point on the elliptical path moves closer to the center and decreases as the travel point moves away from the center. For this purpose the displaceable slide contact of rheostat 27 may be connected through a synchro with the tube 19 so as to move toward or away from a given or adjusted center position in accordance with the variation in angular deflection of the tube 9 relative to the cover 4. Another way of controlling the motor speed is to mount a source of light above the center of the precipitation area and attach a photoelectric cell to the gas supply tube 9. As the distance of the cell from the light source increases, the illumination of the cell also increases and correspondingly reduces an electric current which is used for controlling the motor speed such as by varying the resistance of resistor 27 or controlling the effective electronic resistance circuits known for motor control purposes.

I claim:

1. The method of growing epitaxial crystalline layers on substrates in a reaction vessel by precipitation of material from reaction gas supplied throught the opening of a supply member toward a given precipitation area where the substrates are located in spaced relation to said opening, which method comprises moving the supply member for the duration of the precipitation process over said area in a curve closed upon itself so as to have the image defined by the orthogonal projection of said opening onto said total precipitation area reach equally often every point of the same radial distance from the center of said area.

2. The method according to claim 1, wherein the dwell time of said image monotonously decreases from the outer toward the more inward points of image travel.

3. The method according to claim 1, which comprises mounting and heating the substrates on top of a support, supply fresh reaction gas to the vessel through said member from the vessel side opposite said support, and moving said member in a regularly repetitive curve over the substrate area of said support.

4. The method according to claim 1, wherein said image is repeatedly moved along said entire curve within each given fraction of the total duration of the epitaxial precipitation process, said fraction being sufficiently long for growing an appreciable layer thickness of not more than about 2 microns.

5. The method according to claim 1, wherein said closed curve is everywhere spaced from the center of said area, so that the dwell time of said image at and near the center is zero.

6. The method according to claim 1, wherein said area is substantially circular and the travel path of said image on said area extends along the periphery of said area.

7. The method according to claim 6, wherein said travel path is a circle and the travel speed is uniform and at least equal to one-half rotation per minute.

8. The method according to claim 1, wherein said image is moved on an elliptical path, and which comprises continuously varying the angular positon of the main axes of said elliptical path.

9. The method according to claim 1, wherein said image is moved on a substantially epicyclical path about the center of said precipitation area.

10. The method according to claim 1, which comprises moving the image on a non-circular path about the center of said precipitation area, and varying the travel speed in inverse relation to the distance of the image from said center.

11. The method according to claim 1, which comprises issuing the reaction gas from the opening of said supply member onto said area at a maximum flow speed corresponding to the Reynolds number 50.

12. The method according to claim 11, which comprises supplying the reaction gas downwardly from said opening onto said precipitation area through a distance equal to at most 1.5 times the hydraulic diameter of the reaction space measured at the height of the substrates above the vessel bottom, and removing the spent reaction gas upwardly out the reaction vessel.

13. The method according to claim 1, which comprises supplying the reaction gas at the outside of said vessel to said supply member, passing the gas in said member from above downwardly into said vessel, and moving said member from the outside on said closed curve.

14. The method according to claim 13, which comprises issuing the reaction gas in said vessel through several parallel branch tubes having respective openings, and moving said tubes conjointly along said curve.

15. Apparatus for growing epitaxial crystalline layers on substrates, comprising a reaction vessel, substrate heater means disposed in said vessel and defining a precipitation area for accommodating the substrates, reaction gas supply means extending from the outside into said vessel and having gas nozzle means with a gas supply opening opposite and spaced from said area, said nozzle means being movable relative to said area so as to permit moving said opening along a closed curve to have the image defined by the orthogonal projection of said opening onto said precipitation area reach equally often any point equally spaced from the center of said area.

16. Apparatus according to claim 15, comprising drive means mounted outside said vessel and coupled with said nozzle means for periodically moving the latter.

17. In apparatus according to claim 15, said nozzle means comprising a tube, said vessel having a cover, and said tube extending from the outside through said cover into said vessel and being angularly movable and gas-tightly sealed relative to said cover.

18. In apparatus according to claim 17, said cover having an elastic gasket-ring seal, and said tube being non-revolvably held in said ring seal so as to be angularly displaceable relative thereto.

19. In apparatus according to claim 17, said vessel having an upper portion and a bottom portion separably joined with each other, said cover forming the top of said upper portion, and said tube extending from the outside down into said lower portion of said vessel.

20. Apparatus for growing epitaxial crystalline layers on substrates, comprising a reaction vessel, substrate heater means disposed in said vessel and defining a precipitation area for accommodating the substrates, reaction gas supply means extending from the outside into said vessel and having gas nozzle means with a gas supply opening opposite and spaced from said area, said nozzle means comprising a tube, said vessel having a cover, and said tube extending from the outside through said cover into said vessel and being angularly movable and gas-tightly sealed relative to said cover, so as to permit moving said opening along a closed curve to have the image defined by the orthogonal projection of said opening onto said precipitation area reach equally often any point equally spaced from the center of said area, and a protective cuff coaxially mounted on said tube near said cover and having a curved cross-sectional shape whose opening faces said cover.

21. Apparatus according to claim 17, comprising gas outlet means arranged in concentrical relation to said vessel and said precipitation area.

22. A device for epitactic precipitation of disc-shaped substrate bodies which are arranged on the bottom of a circular cylindrical reaction vessel and which are heated from below, a gas supply pipe is provided for the supply of fresh reaction gas and extends from above into the reaction vessel, said gas supply pipe is guided gas-tightly through the wall of said reaction vessel and is rotatably positioned during its passage through the housing wall.

References Cited

UNITED STATES PATENTS

| | | | |
|---|---|---|---|
| 2,631,948 | 3/1953 | Belitz et al. | 117—107.2 X |
| 2,887,088 | 5/1959 | Nack | 118—48 |
| 3,053,638 | 9/1962 | Reiser. | |
| 3,058,812 | 10/1962 | Chu et al. | |
| 3,160,522 | 12/1964 | Heywang et al. | 117—229 |
| 3,233,578 | 2/1966 | Capita | 118—49.1 |
| 3,240,623 | 3/1966 | Heim | 118—49.5 X |
| 3,301,213 | 1/1967 | Grochowski et al. | |
| 3,381,114 | 4/1968 | Nakamura | 118—49.5 |

ANDREW G. GOLIAN, Primary Examiner

U.S. Cl. X.R.

117—106; 118—48